US009052755B2

(12) United States Patent
Zhen et al.

(10) Patent No.: US 9,052,755 B2
(45) Date of Patent: Jun. 9, 2015

(54) OVERLAPPED HANDWRITING INPUT METHOD

(75) Inventors: Lixin Zhen, Shanghai (CN); Teng Long, Shanghai (CN)

(73) Assignee: INTSIG INFORMATION CO., LTD, Shanghai (CN)

(*) Notice: Subject to any disclaimer, the term of this patent is extended or adjusted under 35 U.S.C. 154(b) by 190 days.

(21) Appl. No.: 13/992,392

(22) PCT Filed: Aug. 3, 2011

(86) PCT No.: PCT/CN2011/077950
§ 371 (c)(1),
(2), (4) Date: Jun. 7, 2013

(87) PCT Pub. No.: WO2012/075821
PCT Pub. Date: Jun. 14, 2012

(65) Prior Publication Data
US 2015/0030249 A1   Jan. 29, 2015

(30) Foreign Application Priority Data
Dec. 10, 2010 (CN) .......................... 2010 1 0583601

(51) Int. Cl.
G06K 9/18       (2006.01)
G06F 3/0354    (2013.01)
G06K 9/00       (2006.01)
G06T 7/00        (2006.01)

(52) U.S. Cl.
CPC ........ *G06F 3/03545* (2013.01); *G06K 9/00442* (2013.01); *G06T 7/004* (2013.01); *G06T 2207/20076* (2013.01)

(58) Field of Classification Search
CPC . G06K 9/222; G06K 9/00872; G06K 9/6292; G06K 9/00409; G06F 3/04883

USPC .......................... 345/173; 348/14.03; 382/186
See application file for complete search history.

(56) References Cited

FOREIGN PATENT DOCUMENTS

| CN | 1272691   A |   | 11/2000 |           |
|----|-------------|---|---------|-----------|
| CN | 1604016   A | * | 4/2005  | ...... G06F 3/02 |
| CN | 101620501 A |   | 1/2010  |           |
| CN | 101620501 B | * | 4/2012  | ...... G06F 3/048 |

OTHER PUBLICATIONS

International Search Report issued in International Patent Application No. PCT/CN2011/077950 dated Nov. 10, 2011.

* cited by examiner

*Primary Examiner* — Gregory F Cunningham
(74) *Attorney, Agent, or Firm* — Oliff PLC

(57) ABSTRACT

An overlapped handwriting input method, which includes: moving a touch unit on a touch screen, recording and displaying the track of a stroke on a handwriting area of the screen; determining whether the stroke currently being written and all previously input strokes having a color A belong to the same character; if yes, keeping the current stroke color unchanged; otherwise, determining whether an inactive visual layer character is present on the screen; if yes, clearing an image of the inactive character and related stroke information; otherwise, defining as the inactive character all strokes having the color A, excluding the current stroke; submitting data of the current inactive character to a recognition engine, and outputting a recognition result. Thus, the interface friendliness for users to continuously input handwriting according to their natural writing practice is ensured, and multiple handwritten characters can be written continuously without pause, thereby improving handwriting input efficiency.

10 Claims, 6 Drawing Sheets

OVERLAPPED HANDWRITING INPUT METHOD

BACKGROUND OF THE PRESENT INVENTION

1. Field of Invention

The present invention relates to the technical field of character input, specifically to handwriting input method, and more specifically to an overlapped handwriting input method.

2. Description of Related Arts

Recently, the handwriting input method, as an important character input manner, has been widely applied in various mobile electronic devices, such as a smart phone, a tablet computer, a netbook, a global positioning system (GPS) terminal, and a learning machine. The handwriting input method generally refers to that a user writes characters on a touch screen of an electronic device by using a handwriting pen or a finger, the electronic device recognizes collected tracks of the written characters, converts the tracks into corresponding characters, and displays the characters on the screen. During collecting the data of the handwritten tracks of the user, the electronic device usually displays the handwritten tracks of the user on a display screen in real time, so that the user can conveniently view track feedback information of strokes of the written characters in real time.

The touch screen and display screen of the current mobile electronic device has a limited size, especially in a new generation smart phone, such as an iPhone and an Android phone, the handwriting input is generally implemented by sensing a moving track of a human finger on a capacitive touch screen, and because of the limited size of the touch screen and limited resolution of the finger touch point, the user can only write one or two characters on the touch screen at a time, and the user, after finishing writing one character, usually has to stop for a while (the typical stop time is about 200 ms-1000 ms) and wait for the mobile device to perform detection and recognition of the latest written character before handwriting inputting the next character. In this way, the efficiency of character handwriting input is low, and the user cannot input continuous handwriting according to the user's natural writing practice.

In order to improve the handwriting input efficiency, related researchers developed a handwriting input solution of full-screen handwriting and full-screen recognition, in which several characters can be written on the touch screen at a time, and an image of all the written characters is submitted to a recognition engine for analysis and recognition. However, this method is still limited by the size of the touch screen, and cannot perform continuous writing of any number of characters (for example, writing of a complete sentence). Especially, on a mobile electronic device with a touch screen having a limited size (for example, a smart phone), the number of characters that can be written at a time on the full screen of the touch screen is generally small (for example, for an iPhone smart phone, the number of characters that can be written on a screen by using a finger is less than 4), moreover, if different characters are connected or overlapped when the user performs full-screen handwriting, the recognition engine may fail to correctly segment and recognize characters.

The present invention performs a character handwriting input method for continuous writing of any number of characters in an overlapped writing manner, thus effectively solves the above problems. The so-called overlapped writing manner refers to a manner that, the user, after finishing writing one character, can completely or partially overlap the next written character on the previous character. This method enables the user to write different characters without any pause, and multiple handwritten characters can be written continuously on a handwriting input screen and be correspondingly recognized, thereby greatly improving the efficiency of character handwriting input. However, a major problem of the method lies in that, during the overlapped writing, the existence of strokes of old characters interferes with the displaying of strokes of a newly written character on the touch screen (for example, the display of overlapped writing tracks of two characters "科学" shown in FIG. 1), which affects the display feedback to the user, causes visual interference on new writing track of the user, and reduces the user experience and input efficiency. The problem is especially severer when overlapped writing multiple characters continuously, for example, when continuously writing three characters "科学家", as shown in FIG. 3, the user can hardly see the track of strokes of the newly written character clearly when the user writes the third character "家".

SUMMARY OF THE PRESENT INVENTION

An object of the present invention is to provide an overlapped handwriting input method, in which different display colors are given for a stroke of a currently written overlapped character and strokes of a previous completely written character by determining an initial stroke of the overlapped characters, thereby achieving clear display without interfering with the handwriting input of the user.

In order to solve the above technical problem, the present invention adopts the following technical solution:

An overlapped handwriting input method, comprising:

Step S111: touching a touch screen with a handwriting pen or finger, and starting to input a stroke;

Step S112: Moving the handwriting pen or finger on the touch screen, recording and displaying the track of the stroke on a handwriting area of the touch screen, and drawing the track of the current stroke by using a given color A;

Step S113: moving the handwriting pen or finger away from the touch screen, and ending the input of the current stroke;

Step S114: Determining whether the stroke being currently written and all previously input strokes having the color A belong to the same character; if yes, going to Step S124; otherwise, going to Step S115;

Step S115: Determining whether an inactive visual layer character is present on the screen, where the inactive visual layer character refers to the last completely written character that has undergone recognition and color transformation, and the character is defined in Step S117; if yes, going to Step S116; otherwise, going to Step S117;

Step S116: Clearing an image of the inactive visual layer character and related stroke information;

Step S117: Defining the character constituted by all strokes having the color value A, except for the current stroke, as the inactive visual layer character;

Step S118: Submitting data of the current inactive visual layer character to a recognition engine for recognition, and outputting recognition result;

Step S119: Determining whether the recognition result provided by the recognition engine is reliable enough; if yes, going to Step S120; otherwise, going to Step S122;

Step S120: Fading the color of the strokes of the current inactive visual layer character until the color disappear;

Step S121: Clearing the image of the inactive visual layer character and the related stroke information; going to Step S123;

Step S122: Transforming the color of the strokes of the current inactive visual layer character to another color B for display;

Step S123: Determining whether a new stroke is input, and if yes, going to Step S112; otherwise, going to Step S126;

Step S124: Keeping the color of the current stroke unchanged;

Step S125: Determining whether a new stroke is input, and if yes, going to Step S112; otherwise, going to Step S126;

Step S126: Submitting the data of the character being currently written to the recognition engine for recognition, and outputting a recognition result; and Step S127: Ending.

As a preferred implementation of the present invention, in Step S114, whether the stroke being currently written and the previously input strokes belong to the same character is determined according to a relationship between geometric position information of the stroke being currently written and geometric position information of the character constituted by all previously input strokes.

As another preferred implementation of the present invention, in Step S114, assistant determination is performed in combination with the recognition result, which specifically comprises: performing recognition of the character constituted by all the written strokes having the color A except for the current stroke, if the recognition reliability is high, determining that the current stroke and the previous strokes do not belong to the same character;

the method of determining the recognition reliability of the recognition engine recognizing a certain handwritten character comprises:

calculating the difference between a probability of the character to be recognized belonging to a first candidate character and a probability of the character to be recognized belonging to a second candidate character, and if the difference is greater than a certain set threshold, determining that the reliability of the recognition result provided by the recognition engine is high;

the method of calculating the probability of the character to be recognized belonging to a certain candidate recognition result character is provided by a recognition classifier;

a quadratic discriminant function classifier is used as the classifier, and the probability is approximate to a negative exponent of a recognition distance provided by the quadratic discriminant function classifier.

As a preferred solution of the present invention, in Step S114, the method of determining whether the stroke being currently written and all the previously input strokes having the color A belong to the same character comprises:

Step 141: Determining whether the current stroke is a first stroke input by the user; if yes, going to Step 146; otherwise, going to Step 142;

Step 142: Determining whether the current stroke is a stroke of a character being newly written at the right of the previously stroke; if yes, going to Step 145; otherwise, going to Step 143;

Step 143: Determining whether the current stroke overlaps another stroke having been written; if yes, going to Step 144; otherwise, going to Step 145;

Step 144: Determining whether the overlapping degree of the current stroke and the stroke having been written is greater than a certain given threshold; if yes, going to Step 146; otherwise, going to Step 145;

Step 145: Returning a determination result that the currently input stroke and the previously input stroke may belong to the same character; and Step 146: Returning a determination result that the currently input stroke and the previously input stroke do not belong to the same character.

As a preferred implementation of the present invention, in Step S119, the method for determining the recognition reliability of the recognition engine recognizing a certain handwritten character comprises:

Calculating the difference between the probability of the character to be recognized belonging to a first candidate character and the probability of the character to be recognized belonging to a second candidate character, and if the difference is greater than a certain set threshold, determining that the reliability of the recognition result provided by the recognition engine is high;

the method of calculating the probability of the character to be recognized belonging to a certain candidate recognition result character is provided by a recognition classifier;

a quadratic discriminant function classifier is used as the classifier, and the probability is approximate to a negative exponent of a recognition distance provided by the quadratic discriminant function classifier.

An overlapped handwriting input method, comprising:

Step S111: Touching a touch screen through a touch unit, and starting to input a stroke;

Step S112: Moving the touch unit on the touch screen, recording and displaying the track of a stroke on a handwriting area of the touch screen, and drawing the track of the current stroke using a given color A;

Step S113: Moving the touch unit away from the touch screen, and ending the input of the current stroke;

Step S114: Determining whether the stroke being currently written and all previously input strokes having the color A belong to a same character; if yes, keeping the color of the current stroke unchanged; otherwise, going to Step S115;

Step S115: Determining whether there is an inactive visual layer character on the screen, wherein the inactive visual layer character refers to the last completely written character that has undergone recognition and color transformation, and the character is defined in Step S117; if yes, going to Step S116; otherwise, going to Step S117;

Step S116: Clearing an image of the inactive visual layer character and related stroke information;

Step S117: Defining a character constituted by all strokes having the color value A, except for the current stroke, as the inactive visual layer character; going to Step S118; and Step S118: Submitting data of the current inactive visual layer character to a recognition engine for recognition, and outputting a recognition result.

As a preferred implementation of the present invention, after Step S118, the method further comprises:

Step S119: Determining whether the recognition result provided by the recognition engine is reliable enough; if yes, going to Step S120; otherwise, going to Step S122;

Step S120: Fading the color of the strokes of the current inactive visual layer character until disappearance of the color;

Step S121: Clearing the image of the inactive visual layer character and the related stroke information; going to Step S123;

Step S122: Transforming the color of the strokes of the current inactive visual layer character to another color B for display; going to Step S123;

Step S123: Determining whether a new stroke is input, and if yes, going to Step S112; otherwise, going to Step S126;

Step S125: Determining whether a new stroke is input, and if yes, going to Step S112; otherwise, going to Step S126;

Step S126: Submitting the data of the character being currently written to the recognition engine for recognition, and outputting a recognition result; and Step S127: Ending.

The implementation of the present invention requires the following hardware conditions: the device requires general computing and storage apparatuses, including a central processing unit (CPU) of a certain frequency, and requires a memory for computing and storage space for storing system software, basic operating system, application software and various data. The device requires a touch screen capable of performing handwriting input, where a random area on the touch screen may be designated as a handwriting input area, and the touch screen still has an area for displaying the recognition result, a command button area, and the like.

The present invention has the following beneficial effects: by using the overlapped handwriting input method according to the present invention, when the user performs overlapped writing on the touch screen, the interface display processing method enables different overlapped characters to be well fed back and displayed to the user, without any confusion of the display interface, thereby ensuring the interface friendliness for the user to input continuous handwriting according to the user's natural writing practice, allowing multiple handwritten characters to be written continuously without any pause, and improving the efficiency of handwriting input.

DETAILED DESCRIPTION OF THE PREFERRED EMBODIMENTS

Figure 1:
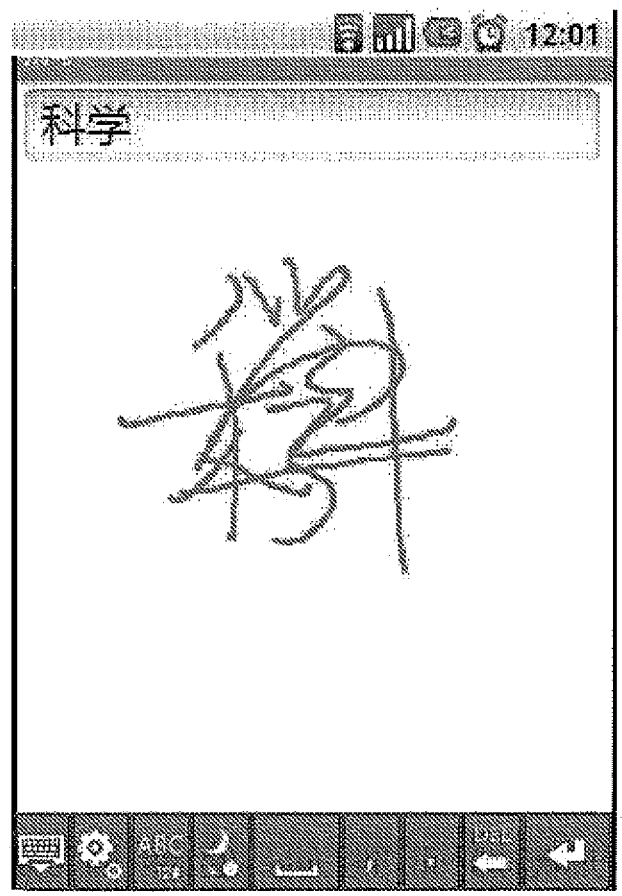
FIG. 1 shows an interface display effect of writing two characters "科学" by using a conventional overlapped writing manner (without being processed by the method of the present invention).
Figure 2:
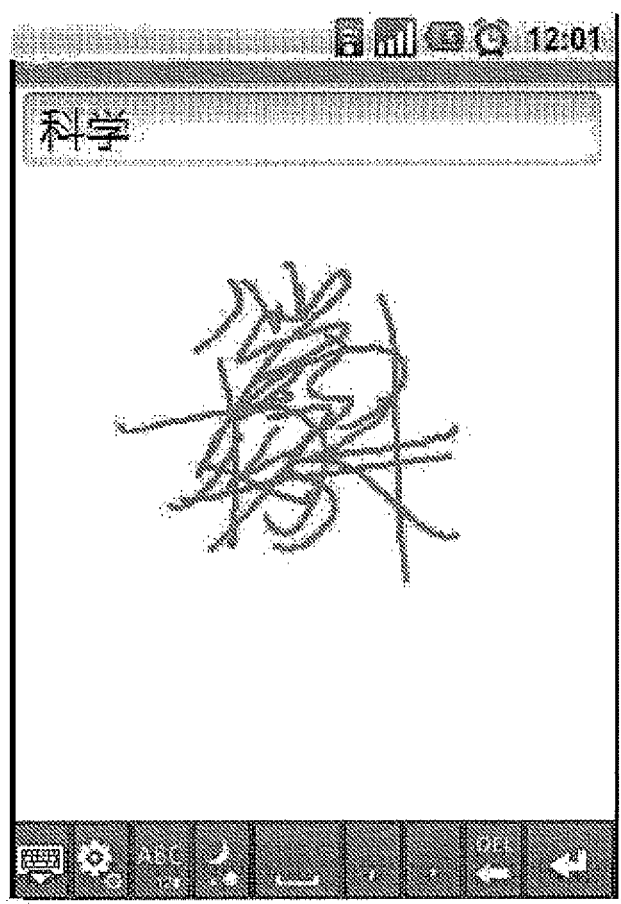
FIG. 2 shows a screen interface display effect of writing three characters "科学家" by using the conventional overlapped writing manner (without being processed by the method of the present invention).

Preferred embodiments of the present invention are further illustrated in detail by referring to the drawings.

Embodiment 1

A device for implementing the patent of the present invention may be a smart phone having a touch screen (for example, an HTC/Google Nexus One smart phone), where the phone has a touch screen and is capable of collecting the track of strokes written by the user through a finger. The present invention can be well implemented by using various processing programs edited using the C++ language. The present invention may also be implemented on another mobile electronic device such as a tablet computer, a personal digital assistant (PDA), and a UPS terminal; the present invention may also be implemented by using another programming language such as C and Java.

Figure 3:
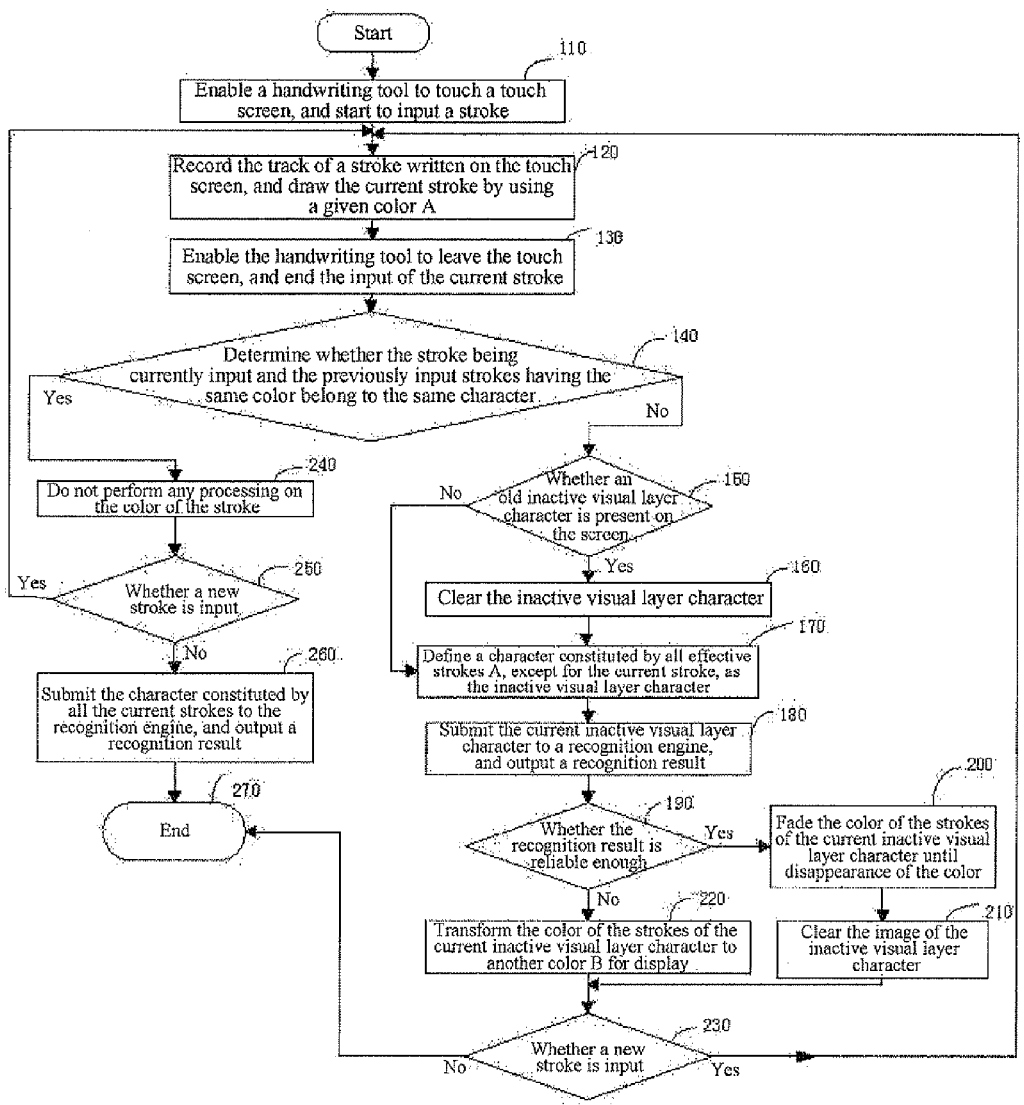
FIG. 3 is a flow chart of a handwriting input method according to the present invention.

Referring to FIG. 3, the present invention provides an overlapped handwriting input method, which comprises the following steps.

[Step 100] Starting, and performing initialization process: clearing the screen, and clearing an inactive visual layer character.

[Step 110] touching the touch screen with a handwriting pen or finger, and start to input a stroke.

[Step 120] Moving the handwriting pen or finger on the touch screen, record and display the track of the stroke on a handwriting area of the touch screen, and draw the track of the current stroke by using a color value RGB (255, 0, 0).

[Step 130] Moving the handwriting pen or finger away from the touch screen, and ending the input of the current stroke.

[Step 140] Determining whether the stroke being currently written and all previously input strokes having the color of red (an RGB value thereof being (255, 0, 0)) belong to a same character, and if yes, going to Step 240; otherwise, going to Step 150.

Figure 4:
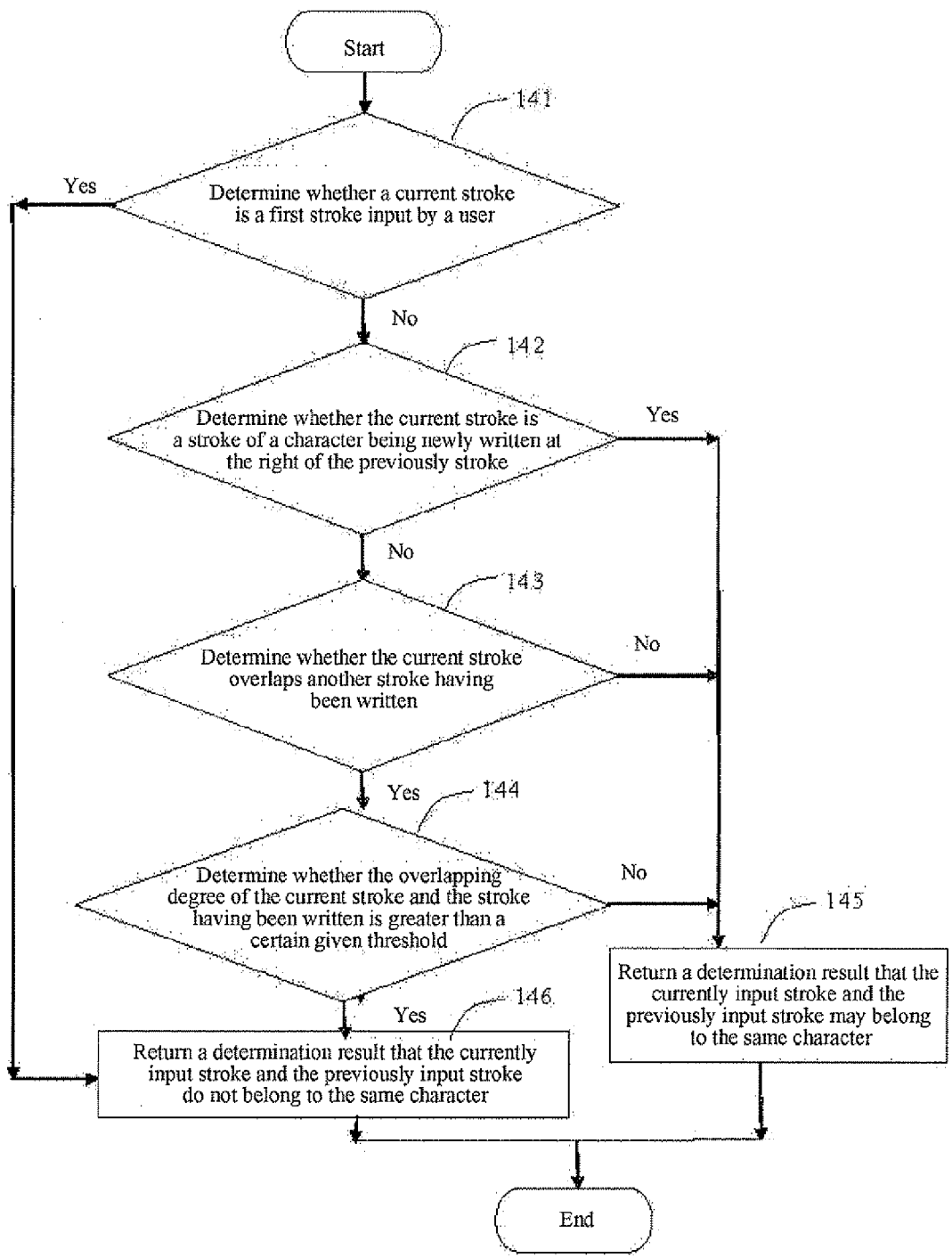
FIG. 4 is a flow chart of steps of determining whether a stroke being currently written and previous strokes belong to the same character.

Whether the stroke being currently written and the previously input strokes belong to the same character can be determined according to a relationship between geometric position information of the stroke being currently written and geometric position information of the character constituted by all the previously input strokes, and a specific implementation flow chart is shown in FIG. 4. In order to improve the determination accuracy, assistant determination may be performed in combination with the recognition result, which specifically includes: performing recognition on the character constituted by all the previously written strokes having the color of red (RGB (255, 0, 0)) except for the current stroke, and if the recognition reliability is high, determining that the current stroke and the previous strokes do not belong to the same character.

The method of determining the recognition reliability of the recognition engine recognizing a certain handwritten character is: calculating the difference between a probability of the character to be recognized belonging to a first candidate character and a probability of the character to be recognized belonging to a second candidate character, and if the difference is greater than a certain set threshold (for example, 0.5), determining that the reliability of the recognition result provided by the recognition engine is high. The method of calculating the probability of the character to be recognized belonging to a certain candidate recognition result character is provided by a recognition classifier, and in this embodiment, a quadratic discriminant function classifier is used as the classifier, and the probability is approximate to a negative exponent of a recognition distance provided by the quadratic discriminant function classifier.

Referring to FIG. 4, the step of determining whether the stroke being currently written and all previously input strokes having the color A belong to the same character includes the following steps:

Step 141: Determining whether the current stroke is a first stroke input by the user; if yes, going to Step 146; otherwise, going to Step 142;

Step 142: Determining whether the current stroke is a stroke of a character being newly written on the right of the previously stroke; if yes, going to Step 145; otherwise, going to Step 143;

Step 143: Determining whether the current stroke overlaps another stroke having been written; if yes, going to Step 144; otherwise, going to Step 145;

Step 144: Determining whether the overlapping degree of the current stroke and the stroke having been written is greater than a certain given threshold; if yes, going to Step 146; otherwise, going to Step 145;

Step 145: Returning a determination result that the currently input stroke and the previously input stroke may belong to a same character; and Step 146: Returning a determination result that the currently input stroke and the previously input stroke do not belong to a same character.

[Step 150] Determining whether an inactive visual layer character (the inactive visual layer character refers to the last completely written character that has undergone recognition and color transformation, and the character is defined in Step S170) is present on the screen; if yes, proceed to Step 160; otherwise, proceed to Step 170.

[Step 160] Clearing the image of the inactive visual layer character and related stroke information.

[Step 170] Defining a character constituted by all strokes having the color value A, except for the current stroke, as the inactive visual layer character.

[Step 180] Submitting data of the current inactive visual layer character to a recognition engine for recognition, and output a recognition result.

[Step 190] Determining whether the recognition result provided by the recognition engine is reliable enough; if yes, going to Step S200; otherwise, going to Step S220.

The method of determining the recognition reliability of the recognition engine recognizing a certain handwritten character is: calculating a difference between a probability of the character to be recognized belonging to a first candidate character and a probability of the character to be recognized belonging to a second candidate character, and if the difference is greater than a certain set threshold (for example, 0.5), determining that the reliability of the recognition result provided by the recognition engine is high. The method of calculating the probability of the character to be recognized belonging to a certain candidate recognition result character is provided by a recognition classifier, and in this embodiment, a quadratic discriminant function classifier is used as the classifier, and the probability is approximate to a negative exponent of a recognition distance provided by the quadratic discriminant function classifier.

[Step 200] Fading the color of the strokes of the current inactive visual layer character until disappearance of the color. In this embodiment, it is set that the background color of the screen is white (RGB (255, 255, 255)), and the specific color fading is described in the pseudo-C language as follows:

```
{
    Define a color variable i=0;
    Define a color variable j=0;
    While (i<=255&&j<=255)
    {
        Transform the stroke color to RGB (255, i, j);
        i=i+10;
        j=j+10;
        Display the stroke color;
        Delay for 1ms;
    }
}
```

Figure 7:
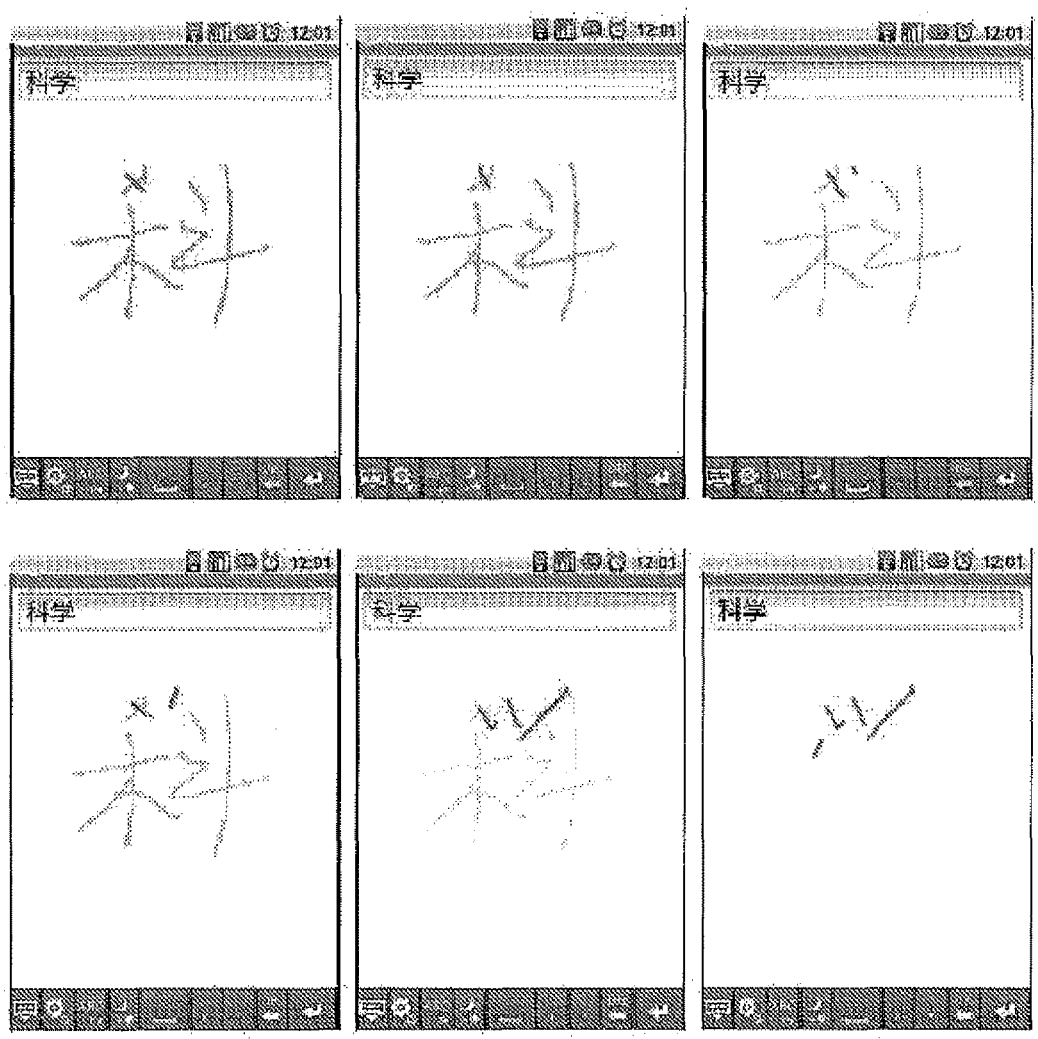
FIG. 7 shows a screen interface display effect of fading processing of the first character "科" having high recognition reliability when overlapped writing two characters "科学".

The specific implementation effect is shown in FIG. 7.

[Step 210] Clearing the image of the inactive visual layer character and the related stroke information; proceed to Step 230.

[Step 220] Transforming the color of the strokes of the current inactive visual layer character to light gray (RGB (190, 190, 190)) for display.

Figure 5:
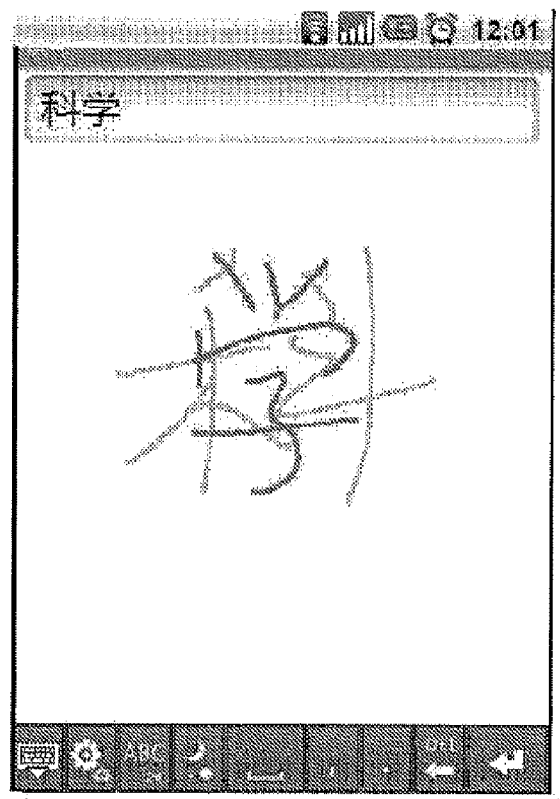
FIG. 5 shows a screen interface display effect of overlapped writing two characters "科学" after being processed according to the method of the present invention.

FIG. 5 shows a screen interface display effect of overlapped writing two characters "科学" after being processed according to the above steps.

[Step 230] Determining whether a new stroke is input, and if yes, wait for the user to input the new stroke, and proceed to Step 120; otherwise, proceed to Step 260.

[Step 240] Keeping the color of the current stroke unchanged.

[Step 250] Determining whether a new stroke is input, and if yes, wait for the user to input the new stroke, and going to Step 120; otherwise, going to Step 260.

[Step 260] Submitting the data of the character being currently written to the recognition engine for recognition, and outputting a recognition result.

[Step 270] Ending.

Figure 6:
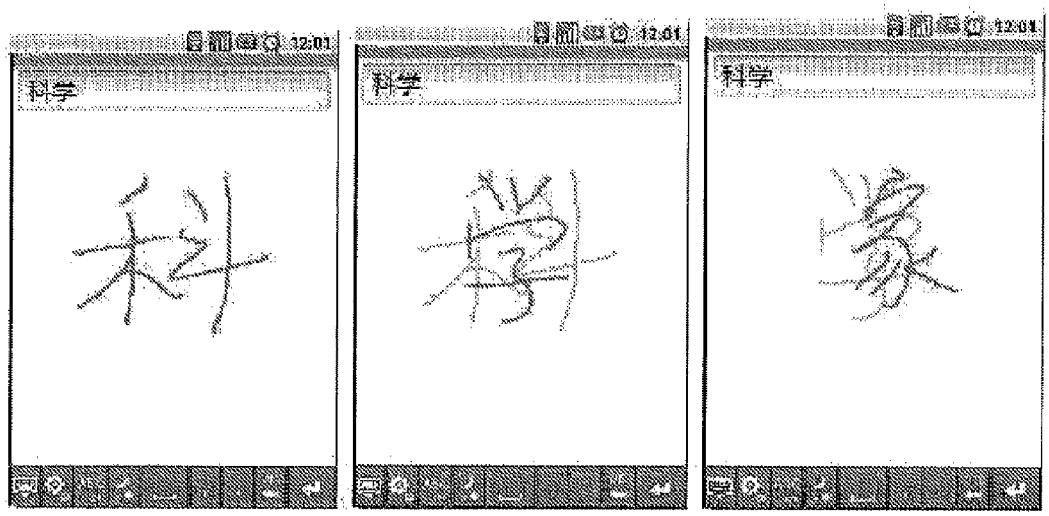
FIG. 6 shows a procedure and a corresponding screen interface display effect of overlapped writing three characters "科学家" after being processed according to the method of the present invention.

FIG. 6 shows a procedure and a corresponding screen interface display effect of overlapped writing three characters "科学家" after being processed according to the method of the present invention.

Embodiment 2

This embodiment discloses an overlapped handwriting input method, which comprises the following steps:

Step S111: Touching a touch screen through a touch unit, and starting to input a stroke;

Step S112: Moving the touch unit on the touch screen, recording and displaying the track of a stroke on a handwriting area of the touch screen, and drawing the track of the current stroke using a given color A;

Step S113: Moving the touch unit away from the touch screen, and ending the input of the current stroke;

Step S114: Determining whether the stroke being currently written and all previously input strokes having the color A belong to a same character; if yes, keeping the color of the current stroke unchanged; otherwise, going to Step S115;

Step S115: Determining whether an inactive visual layer character is present on the screen, wherein the inactive visual layer character refers to the last completely written character that has undergone recognition and color transformation, and the character is defined in Step S117; if yes, going to Step S116; otherwise, going to Step S117;

Step S116: Clearing the image of the inactive visual layer character and related stroke information;

Step S117: Defining a character constituted by all strokes having the color value A, except for the current stroke, as the inactive visual layer character; going to Step S118; and Step S118: Submitting data of the current inactive visual layer character to a recognition engine for recognition, and outputting a recognition result.

Preferably, after Step S118, the method further comprises:

Step S119: Determining whether the recognition result provided by the recognition engine is reliable enough; if yes, going to Step S120; otherwise, going to Step S122;

Step S120: Fading the color of the strokes of the current inactive visual layer character until disappearance of the color;

Step S121: Clearing the image of the inactive visual layer character and the related stroke information; going to Step S123;

Step S122: Transforming the color of the strokes of the current inactive visual layer character to another color 13 for display; going to Step S123;

Step S123: Determining whether a new stroke is input, and if yes, going to Step S112; otherwise, going to Step S126;

Step S125: Determining whether a new stroke is input, and if yes, going to Step S112; otherwise, going to Step S126;

Step S126: Submitting the data of the character being currently written to the recognition engine for recognition, and outputting a recognition result; and Step S127: Ending.

In view of the above, by using the overlapped handwriting input method according to the present invention, when the user performs overlapped writing on the touch screen, the interface display processing method enables different overlapped characters to be well fed back and displayed to the user, without any confusion of the display interface, thereby ensuring the interface friendliness for the user to input continuous handwriting according to the user's natural writing practice, allowing multiple handwritten characters to be written continuously without any pause, and effectively improving the efficiency of handwriting input.

The description and application of the present invention are illustrative, and are not intended to limit the scope of the present invention to the above embodiments. Deformations and variations of the disclosed embodiments are available, and for those of ordinary skill in the art, replacements of the embodiments and equivalent members are well-known. Persons skilled in the art should understand that, without departing from the spirit or essential feature of the present invention, the present invention may be implemented in another form, structure, deployment, and scale, and by using other components, materials and members. Other deformations and variations may be performed on the disclosed embodiments without departing from the scope and spirit of the present invention.

What is claimed is:

1. An overlapped handwriting input method, comprising:
Step 100: performing initialization process: clearing a screen, and clearing an inactive visual layer character;
Step 110: enabling a handwriting pen or finger to touch a touch screen, and starting to input a stroke;
Step 120: moving the handwriting pen or finger on the touch screen, recording and displaying the track of the stroke on a handwriting area of the touch screen, and drawing the track of the current stroke by using a first color value;
Step 130: enabling the handwriting pen or finger to leave the touch screen, and ending the input of the current stroke;
Step 140: determining whether the stroke being currently written and all previously input strokes having the first color value belong to the same character, and if yes, going to Step 240; otherwise, going to Step 150,
wherein whether the stroke being currently written and the previously input strokes belong to the same character is determined according to a relationship between geometric position information of the stroke being currently written and geometric position information of a character constituted by all the previously input strokes;
assistant determination is performed in combination with a recognition result, which specifically comprises: performing recognition on the character constituted by all the previously written strokes having the first color value except for the current stroke, and if the recognition reliability is high, determining that the current stroke and the previous strokes do not belong to the same character;
the method of determining the recognition reliability of a recognition engine recognizing a certain handwritten character is: calculating a difference between a probability of the character to be recognized belonging to a first candidate character and a probability of the character to be recognized belonging to a second candidate character, and if the difference is greater than a certain set threshold, determining that the reliability of the recognition result provided by the recognition engine is high;
the method of calculating the probability of the character to be recognized belonging to a certain candidate recognition result character is provided by a recognition classifier; a quadratic discriminant function classifier is used as the classifier, and the probability is approximate to a negative exponent of a recognition distance provided by the quadratic discriminant function classifier; and
Step 140 comprises the following steps:
Step 141: determining whether the current stroke is a first stroke input by a user; if yes, going to Step 146; otherwise, going to Step 142;
Step 142: determining whether the current stroke is a stroke of a character being newly written at the right of the previously stroke; if yes, going to Step 145; otherwise, going to Step 143;
Step 143: determining whether the current stroke overlaps another stroke having been written; if yes, going to Step 144; otherwise, going to Step 145;
Step 144: determining whether the overlapping degree of the current stroke and the stroke having been written is greater than a certain given threshold; if yes, going to Step 146; otherwise, going to Step 145;
Step 145: returning a determination result that the currently input stroke and the previously input stroke may belong to the same character; and
Step 146: returning a determination result that the currently input stroke and the previously input stroke do not belong to a same character;
Step 150: determining whether an inactive visual layer character is present on the screen, wherein the inactive visual layer character refers to the last completely written character that has undergone recognition and color transformation, and the character is defined in Step S170; if yes, going to Step 160; otherwise, going to Step 170;
Step 160: clearing an image of the inactive visual layer character and related stroke information;
Step 170: defining a character constituted by all strokes having a first color value, except for the current stroke, as the inactive visual layer character;
Step 180: submitting data of the current inactive visual layer character to the recognition engine for recognition, and output the recognition result;
Step 190; determining whether the recognition result provided by the recognition engine is reliable enough; if yes, going to Step S200; otherwise, going to Step 220,
wherein the method of determining the recognition reliability of the recognition engine recognizing a certain handwritten character comprises: calculating a difference between a probability of the character to be recognized belonging to a first candidate character and a probability of the character to be recognized belonging to a second candidate character, and if the difference is greater than a certain set threshold, determining that the reliability of the recognition result provided by the recognition engine is high; the method of calculating the probability of the character to be recognized belonging to a certain candidate recognition result character is provided by a recognition classifier; a quadratic discriminant function classifier is used as the classifier, and the probability is approximate to a negative exponent of a recognition distance provided by the quadratic discriminant function classifier;

Step 200: fading the color of the strokes of the current inactive visual layer character until disappearance of the color;

Step 210: clearing the image of the inactive visual layer character and the related stroke information; going to Step 230;

Step 220: transforming the color of the strokes of the current inactive visual layer character to a second color for display;

Step 230: determining whether a new stroke is input, and if yes, waiting for the user to input the new stroke, and going to Step 120; otherwise, going to Step 260;

Step 240: keeping the color of the current stroke unchanged;

Step 250: determining whether a new stroke is input, and if yes, waiting for the user to input the new stroke, and going to Step 120; otherwise, going to Step 260;

Step 260: submitting the data of the character being currently written to the recognition engine for recognition, and outputting a recognition result; and Step 270: ending.

2. An overlapped handwriting input method, comprising:

Step S111: touch a touch screen with a handwriting pen or finger to, and starting to input a stroke;

Step S112: moving the handwriting pen or finger on the touch screen, recording and displaying the track of the stroke on a handwriting area of the touch screen, and drawing the track of the current stroke by using a given color A;

Step S113: moving the handwriting pen or finger away from the touch screen, and ending the input of the current stroke;

Step S114: determining whether the stroke being currently written and all previously input strokes having the color A belong to the same character; if yes, going to Step S124; otherwise, going to Step S115;

Step S115: determining whether an inactive visual layer character is present on the screen, wherein the inactive visual layer character refers to the last completely written character that has undergone recognition and color transformation, and the character is defined in Step S117; if yes, going to Step S116; otherwise, going to Step S117;

Step S116: clearing an image of the inactive visual layer character and related stroke information;

Step S117: defining a character constituted by all strokes having the color value A, except for the current stroke, as the inactive visual layer character;

Step S118: submitting data of the current inactive visual layer character to a recognition engine for recognition, and outputting recognition result;

Step S119: determining whether the recognition result provided by the recognition engine is reliable enough; if yes, going to Step S120; otherwise, going to Step S122;

Step S120: fading the color of the strokes of the current inactive visual layer character until disappearance of the color;

Step S121: clearing the image of the inactive visual layer character and the related stroke information; going to Step S123;

Step S122: transforming the color of the strokes of the current inactive visual layer character to another color B for display;

Step S123: determining whether a new stroke is input, and if yes, going to Step S112; otherwise, going to Step S126;

Step S124: keeping the color of the current stroke unchanged;

Step S125: determining whether a new stroke is input, and if yes, going to Step S112; otherwise, going to Step S126;

Step S126: submitting the data of the character being currently written to the recognition engine for recognition, and outputting a recognition result; and Step S127: Ending.

3. The overlapped handwriting input method according to claim 2, wherein:

in Step S114, whether the stroke being currently written and the previously input strokes belong to the same character is determined according to a relationship between geometric position information of the stroke being currently written and geometric position information of a character constituted by all the previously input strokes.

4. The overlapped handwriting input method according to claim 2, wherein:

in Step S114, assistant determination is performed in combination with the recognition result, which specifically comprises: performing recognition on the character constituted by all the previously written strokes having the first color value except for the current stroke, and if the recognition reliability is high, determining that the current stroke and the previous strokes do not belong to the same character;

the method of determining the recognition reliability of a recognition engine recognizing a certain handwritten character comprises:

calculating the difference between a probability of the character to be recognized belonging to a first candidate character and a probability of the character to be recognized belonging to a second candidate character, and if the difference is greater than a certain set threshold, determining that the reliability of the recognition result provided by the recognition engine is high;

the method of calculating the probability of the character to be recognized belonging to a certain candidate recognition result character is provided by a recognition classifier; and a quadratic discriminant function classifier is used as the classifier, and the probability is approximate to a negative exponent of a recognition distance provided by the quadratic discriminant function classifier.

5. The overlapped handwriting input method according to claim 2, wherein:

in Step S114, the method of determining whether the stroke being currently written and all the previously input strokes having the color A belong to a same character comprises:

Step 141: determining whether the current stroke is a first stroke input by the user; if yes, going to Step 146; otherwise, going to Step 142;

Step 142: determining whether the current stroke is a stroke of a character being newly written at the right of the previously stroke; if yes, going to Step 145; otherwise, going to Step 143;

Step 143: determining whether the current stroke overlaps another stroke having been written; if yes, going to Step 144; otherwise, going to Step 145;

Step 144: determining whether the overlapping degree of the current stroke and the stroke having been written is greater than a certain given threshold; if yes, going to Step 146; otherwise, going to Step 145;

Step 145: returning a determination result that the currently input stroke and the previously input stroke may belong to a same character; and Step 146: returning a determination result that the currently input stroke and the previously input stroke do not belong to a same character.

6. The overlapped handwriting input method according to claim 2, wherein:

in Step S119, the method for determining the recognition reliability of the recognition engine recognizing a certain handwritten character comprises:

calculating the difference between a probability of the character to be recognized belonging to a first candidate character and a probability of the character to be recognized belonging to a second candidate character, and if the difference is greater than a certain threshold, determining that the reliability of the recognition result provided by the recognition engine is high;

the method of calculating the probability of the character to be recognized belonging to a certain candidate recognition result character is provided by a recognition classifier;

a quadratic discriminant function classifier is used as the classifier, and the probability is approximate to a negative exponent of a recognition distance provided by the quadratic discriminant function classifier.

7. An overlapped handwriting input method, comprising:

Step S111: touching a touch screen through a touch unit, and starting to input a stroke;

Step S112: moving the touch unit on the touch screen, recording and displaying the track of a stroke on a handwriting area of the touch screen, and drawing the track of the current stroke using a given color A;

Step S113: moving the touch unit away from the touch screen, and ending the input of the current stroke;

Step S114: determining whether the stroke being currently written and all previously input strokes having a color A belong to the same character; if yes, keeping the color of the current stroke unchanged; otherwise, going to Step S115;

Step S115: determining whether an inactive visual layer character is present on the screen, wherein the inactive visual layer character refers to the last completely written character that has undergone recognition and color transformation, and the character is defined in Step S117; if yes, going to Step S116; otherwise, going to Step S117;

Step S116: clearing an image of the inactive visual layer character and related stroke information;

Step S117: defining a character constituted by all strokes having the color value A, except for the current stroke, as the inactive visual layer character; going to Step S118; and Step S118: submitting data of the current inactive visual layer character to a recognition engine for recognition, and outputting a recognition result.

8. The overlapped handwriting input method according to claim 7, wherein:

after Step S118, the method further comprises:

Step S119: determining whether the recognition result provided by the recognition engine is reliable enough; if yes, going to Step S120; otherwise, going to Step S122;

Step S120: fading the color of the strokes of the current inactive visual layer character until disappearance of the color;

Step S121: clearing the image of the inactive visual layer character and the related stroke information; going to Step S123;

Step S122: transforming the color of the strokes of the current inactive visual layer character to another color B for display; or transforming the color of a newly input stroke to another color B; going to Step S123;

Step S123: determining whether a new stroke is input, and if yes, going to Step S112; otherwise, going to Step S126;

Step S125: determining whether a new stroke is input, and if yes, going to Step S112; otherwise, going to Step S126;

Step S126: submitting the data of the character being currently written to the recognition engine for recognition, and outputting a recognition result; and Step S127: ending.

9. The overlapped handwriting input method according to claim 8, wherein:

in Step S119, the method for determining the recognition reliability of the recognition engine recognizing a certain handwritten character comprises:

calculating the difference between a probability of the character to be recognized belonging to a first candidate character and a probability of the character to be recognized belonging to a second candidate character, and if the difference is greater than a certain set threshold, determining that the reliability of the recognition result provided by the recognition engine is high;

the method of calculating the probability of the character to be recognized belonging to a certain candidate recognition result character is provided by a recognition classifier;

a quadratic discriminant function classifier is used as the classifier, and the probability is approximate to a negative exponent of a recognition distance provided by the quadratic discriminant function classifier.

10. The overlapped handwriting input method according to claim 7, wherein:

in Step S114, whether the stroke being currently written and the previously input strokes belong to a same character is determined according to a relationship between geometric position information of the stroke being currently written and geometric position information of a character constituted by all the previously input strokes;

assistant determination is performed in combination with the recognition result, which specifically comprises: performing recognition on the character constituted by all the previously written strokes having the color A except for the current stroke, and if the recognition reliability is high, determining that the current stroke and the previous strokes do not belong to the same character the method of determining the recognition reliability of the recognition engine recognizing a certain handwritten character comprises: calculating a difference between a probability of the character to be recognized belonging to a first candidate character and a probability of the character to be recognized belonging to a second candidate character, and if the difference is greater than a certain set threshold, determining that the reliability of the recognition result provided by the recognition engine is high; the method of calculating the probability of the character to be recognized belonging to a certain candidate recognition result character is provided by a recognition classifier; a quadratic discriminant function classifier is used as the classifier, and the probability is approximate to a negative exponent of a recognition distance provided by the quadratic discriminant function classifier;

in Step S114, the method of determining whether the stroke being currently written and all the previously input strokes having the color A belong to the same character comprises:

Step 141: determining whether the current stroke is a first stroke input by the user; if yes, going to Step 146; otherwise, going to Step 142;

Step 142: determining whether the current stroke is a stroke of a character being newly written at the right of the previously stroke; if yes, going to Step 145; otherwise, going to Step 143;

Step 143: determining whether the current stroke overlaps another stroke having been written; if yes, going to Step 144; otherwise, going to Step 145;

Step 144: determining whether the overlapping degree of the current stroke and the stroke having been written is greater than a certain given threshold; if yes, going to Step 146; otherwise, going to Step 145;

Step 145: returning a determination result that the currently input stroke and the previously input stroke may belong to a same character; and Step 146: returning a determination result that the currently input stroke and the previously input stroke do not belong to the same character.

\* \* \* \* \*